(12) United States Patent
DeWitt et al.

(10) Patent No.: US 8,737,169 B1
(45) Date of Patent: May 27, 2014

(54) DOG REPELLING DEVICE

(76) Inventors: Kathleen A. DeWitt, Ventura, CA (US);
Benjamin T. DeWitt, Ventura, CA (US)

( * ) Notice: Subject to any disclaimer, the term of this patent is extended or adjusted under 35 U.S.C. 154(b) by 571 days.

(21) Appl. No.: 13/083,937

(22) Filed: Apr. 11, 2011

(51) Int. Cl.
*A01M 29/00* (2011.01)
*A01M 29/18* (2011.01)

(52) U.S. Cl.
CPC .................................. *A01M 29/18* (2013.01)
USPC ........................................................ 367/139

(58) Field of Classification Search
USPC ........................................................ 367/139
See application file for complete search history.

(56) References Cited

U.S. PATENT DOCUMENTS

| | | | |
|---|---|---|---|
| 4,689,776 A | 8/1987 | Thorndyke et al. | |
| 5,214,411 A * | 5/1993 | Herbruck | 340/573.2 |
| 5,606,305 A * | 2/1997 | Jan | 340/384.2 |
| 5,844,472 A * | 12/1998 | Lee | 340/438 |
| 5,864,516 A | 1/1999 | Brown et al. | |
| D410,062 S | 5/1999 | Jan | |
| 6,252,496 B1 | 6/2001 | Jackson | |
| 2003/0051552 A1* | 3/2003 | Ilnicki et al. | 73/599 |
| 2004/0249860 A1* | 12/2004 | Stechschulte et al. | 707/104.1 |
| 2005/0057921 A1* | 3/2005 | Menosky | 362/110 |
| 2007/0105415 A1* | 5/2007 | Jin et al. | 439/122 |
| 2008/0173257 A1* | 7/2008 | Steiner et al. | 119/796 |

* cited by examiner

*Primary Examiner* — Isam Alsomiri
*Assistant Examiner* — James Hulka
(74) *Attorney, Agent, or Firm* — Crossley Patent Law; Micah C. Gunn

(57) ABSTRACT

A dog repelling device for bicyclists that includes a housing that houses a battery-powered timer-controlled ultrasonic pulse emitter and that is releasably attached to a bicycle handle bar with an attachment body, including a hook and loop strip which removably inserts through a slot within a second member of the housing.

12 Claims, 3 Drawing Sheets

DOG REPELLING DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of dog repelling devices are known in the prior art. However, what is needed is a dog repelling device that includes a battery-powered timer-controlled ultrasonic pulse emitter disposed within a housing attached to a bicycle handle bar with a fastener.

FIELD OF THE INVENTION

The present invention relates to a dog repelling device, and more particularly, to a dog repelling device that includes a battery-powered timer-controlled ultrasonic pulse emitter disposed within a housing and which also includes a fastener for attaching the housing to a bicycle handle bar.

SUMMARY OF THE INVENTION

The general purpose of the present dog repelling device, described subsequently in greater detail, is to provide a dog repelling device which has many novel features that result in a dog repelling device which is not anticipated, rendered obvious, suggested, or even implied by prior art, either alone or in combination thereof.

Many cyclists know the discomfort of being harangued by dogs while enjoying a cycle ride in the open. Dogs instinctually react to chase cyclists, responding to their motion as if sensing prey. Some dogs have been known to attack cyclists, or run at them menacingly, interfering with the operation of the bicycle, causing accidents. In even worse situations, some cyclists have been badly injured by menacing dogs whereby the dogs have bitten the cyclists causing, in some instances, very serious bodily harm. The present device has been devised to prevent these dangerous situations, protecting cyclists from menacing dogs and other animals. The device is battery powered and includes a means to produce a modulated, pulsed, ultrasonic frequency—audible to dogs and other animals, but not to humans—of a specific range predetermined and irritable to dogs and other animals, whereby approaching dogs are inhibited from gaining proximity to the cyclist in general, and, once the device is activated, actually repelled therefrom. The device has been devised to be small and easily secured to the handlebars of a bicycle, moped, or motorcycle if preferred, by means of a Velcro strap slotted through a specifically devised slot positioned on the bottom side of the device, thereby securing the device to the handlebars within easy reach of the cyclist to be activated as desired. Considering the many obstacles typical of the suburban landscape, and other places in general, whence dogs can suddenly emerge, the device has been devised such that it can be activated rapidly, with a large button disposed on the top surface of the device which, being mounted on the handlebars, is always within close proximity to the hands when operating a bicycle in the typical fashion. Light emitting diodes are disposed within the button to indicate the state of the battery charge when the device is operated—a green first light emitting diode being activated when the battery has charge enough to operate the production of the ultrasonic modulation and pulsed sounds to repel dogs and other animals, and a red second light emitting diode activating when the battery should soon be changed if the device is to continue to operate as devised, and protect the cyclist from the onslaught of menacing dogs and animals.

Thus has been broadly outlined the more important features of the present dog repelling device so that the detailed description thereof that follows may be better understood and in order that the present contribution to the art may be better appreciated.

Objects of the present dog repelling device, along with various novel features that characterize the invention are particularly pointed out in the claims forming a part of this disclosure. For better understanding of the dog repelling device, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
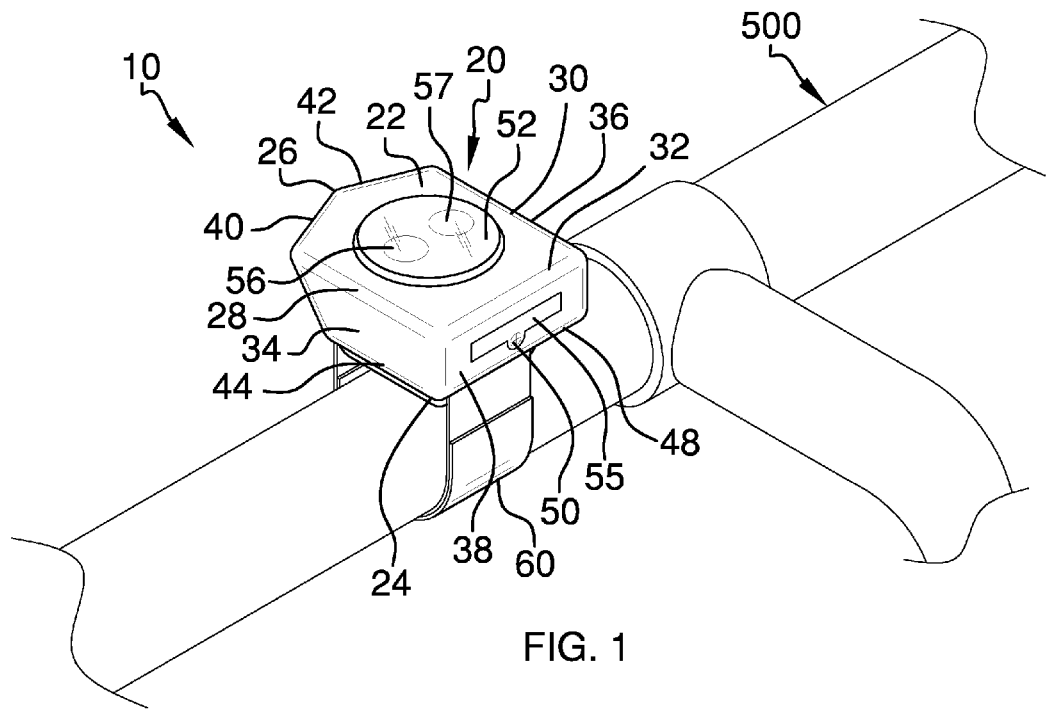
FIG. 1 is an isometric view of the device when in use.
Figure 2:
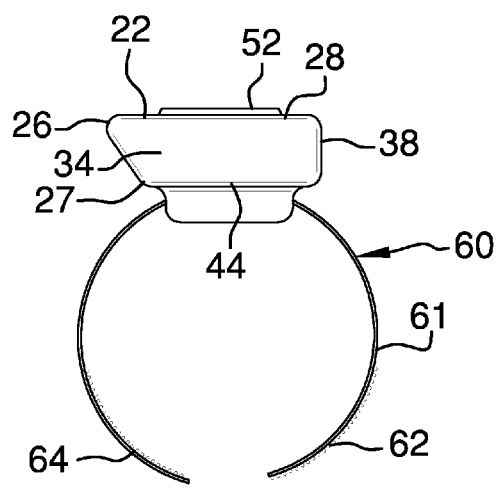
FIG. 2 is a side view.
Figure 3:
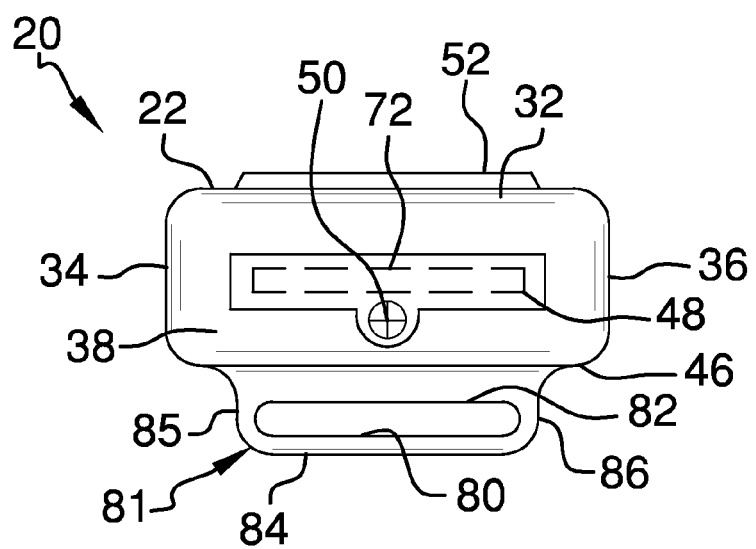
FIG. 3 is a back view.
Figure 4:
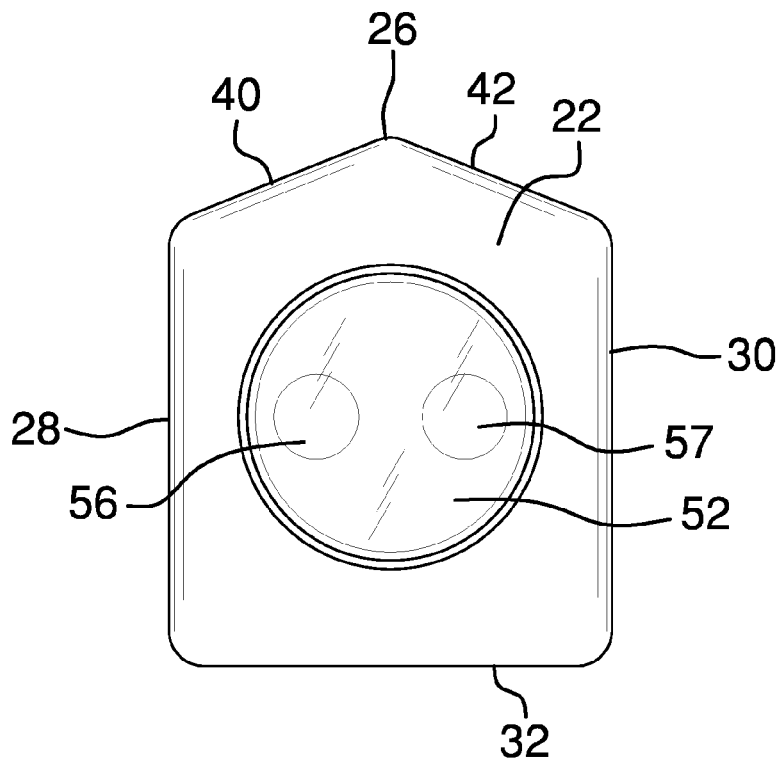
FIG. 4 is top view.
Figure 5:
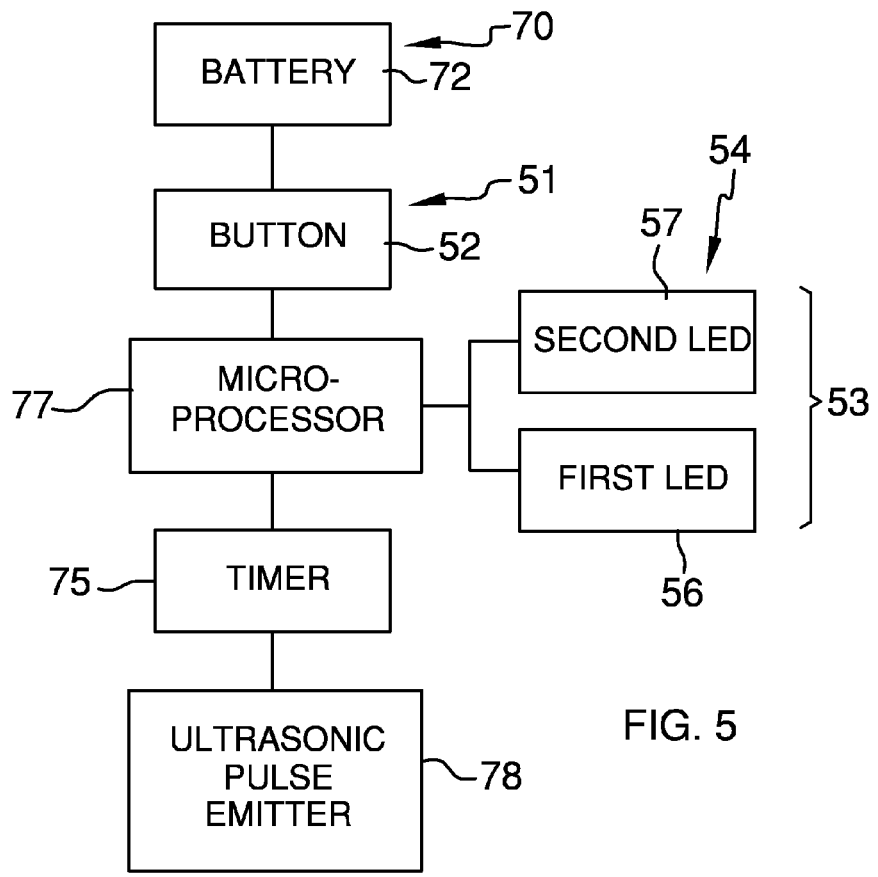
FIG. 5 is a block diagram of operations.
Figure 6:
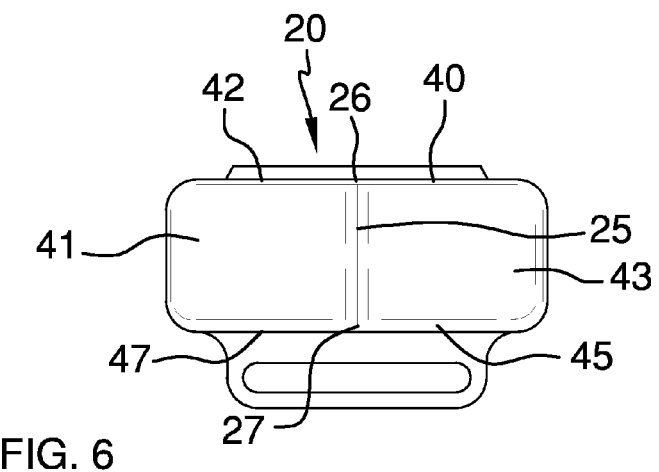
FIG. 6 is a front view.

With reference now to the drawings, and in particular FIGS. 1 through 6 thereof, example of the dog repelling device employing the principles and concepts of the present dog repelling device and generally designated by the reference number 10 will be described.

Referring to FIGS. 1 through 6 a preferred embodiment of the dog repelling device 10 is illustrated.

The dog repelling device 10 includes a housing 20. The housing 20 removably attaches to a set of handlebars 500 of a bicycle and is therefore compactly sized.

In the preferred embodiment, the housing 20 has a bottom surface 24 and a top surface 22. The top surface 22 is pentagonal and has two front edges 40 and 42 that are shorter than a left side 28 of the top surface 22, a right side 30 of the top surface 22, and a rear side 32 of the top surface 22. The front edges 40 and 42 coincide in a continuous first apex 26. While the top surface 22 is pentagonal in the illustrated embodiment, the top surface 22 may include other shapes.

The housing 20 also has trapezoidal left side surface 34 disposed between the top surface 22 and the bottom surface 24, a trapezoidal right side surface 36 disposed opposite the left side surface 34 between the top surface 22 and the bottom surface 24, and a rectangular rear side surface 38. The right side surface 36 is enantiomeric with the left side surface 34.

The bottom surface 24 is shorter than the top surface 22 along the longitudinal axis of the bottom surface 24, has a width equal to a width of the top surface 22. The bottom surface has two shorter sides 45 and 47 coinciding in a second apex 27. These shorter sides 45 and 47 define the bottom edges of the leading surfaces 41 and 43. The bottom surface 24 longer sides 44, 46, 48 are disposed generally at right angles relative to each other and have lengths generally the same relative to each other.

Two leading surfaces 41 and 43 are disposed at an angle off a perpendicular plane relative the top surface 22 and bottom surface 24. The leading surfaces 41 and 43 are conjoined at a leading peak 25 disposed between the top surface 22 and bottom surface 24 and attached to the first and second apices 26 and 27.

The rear side surface 38 is disposed perpendicular between the top surface 22 and bottom surface 24 between the right and left side surfaces 36, 34 wherein a substantially vertical surface continuously disposed perpendicular between the perimeters of the top and bottom 22, 24 surfaces is defined.

The housing 20 also includes a second member 81 attached to the bottom surface 24. The second member 81 has a bottom outer surface 84 and a pair of side struts 85, 86 attached to the bottom surface 24 in a position perpendicular to the bottom surface 24. The slot 80 is continuously disposed along a horizontal axis of the second member 81 proximal to the bottom outer surface 84 in a position parallel to the bottom surface 24.

An attachment body 60 removably attaches the housing 20 to the handlebars 500. The preferred embodiment includes a hook and loop strip 61 as the attachment body 60. The hook and loop strip 61 removably inserts through the slot 80. The hook and loop strip 61 has a first end 62 and a second end 64. The first end 62 releasably attaches to the second end 64 to removably attach the housing 20 to the handlebars 500 of a bicycle.

An ultrasonic pulse emitter 35, configured to produce an ultrasonic, modulated, pulsed frequency, inaudible to humans while audible and repellant to canines and other animals, is disposed within the housing 20.

A power source 70 is disposed within the housing 20 in a battery compartment 55 accessible via the rectangular rear side surface 38. The power source is secured within the battery compartment 55 by a fastener 50. The power source 70 is a battery 72 in a preferred embodiment. In the preferred embodiment, the fastener 50 is a screw.

A timer 75 is disposed within the housing and regulates the emission of the ultrasonic, modulated, pulsed frequency from the ultrasonic pulse emitter 35 over a predetermined interval of time.

An activation-deactivation mechanism 51 is in operational communication with ultrasonic pulse emitter 78. The activation-deactivation mechanism 51 is a button 52 in the preferred embodiment. The button 52 is disposed within the housing 20 top surface 22. The activation-deactivation mechanism 51 includes a power source state indicator 53 that indicates the power level of the power source. The power source state indicator 53 includes light emitting diodes 54. The light emitting diodes 54 include first light emitting diode 56 and a second light emitting diode 57. The first emitting diode 54 is activated and illuminates green when the power source is activated. The second light emitting diode 56 is activated and illuminates red when the power source has a low power level and should soon be changed if the device is to operate. A microprocessor 77 is included in the housing 20 to control and regulate the timer 75, the ultrasonic pulse emitter 78, and the power source state indicator 53.

The above described features of the present device 10 readily enables a cyclist to ward off approaching danger posed by menacing canines, avoid accident or injury resulting from the same, and further enjoy cycling in the outdoors.

What is claimed is:

1. A dog repelling device comprising:
   a housing removably attached to a bicycle handlebar wherein the housing further comprises:
   a top surface;
   a bottom surface;
   a trapezoidal left side surface disposed between the top surface and the bottom surface;
   a trapezoidal right side surface disposed opposite the left side surface between the top surface and the bottom surface;
   a rectangular rear side surface opposite the top surface;
   wherein the right side surface is enantiomeric with the left side surface;
   wherein the bottom surface is shorter than the top surface along the longitudinal axis of the bottom surface and has a width equal to a width of the top surface;
   wherein the bottom surface has two shorter sides coinciding in a second apex, wherein the shorter sides define a bottom edge of each of a pair of leading surfaces;
   wherein the bottom surface has longer sides disposed generally at right angles relative to each other and have lengths generally the same relative to each other;
   a pair of leading surfaces disposed at an angle off a perpendicular plane relative the top surface and the bottom surface, wherein the leading surfaces are conjoined at a leading peak disposed between the top surface and bottom surface and are attached to the first and second apices;
   wherein the rear side surface is disposed perpendicular between the top surface and the bottom surface between the right and left side surfaces;
   wherein a substantially vertical surface is continuously disposed in a perpendicular position between the perimeters of the top and bottom surfaces;
   a second member attached to the bottom surface, wherein the second member has a bottom outer surface and a pair of side struts attached to the bottom surface in a position perpendicular to the bottom surface;
   wherein the slot is continuously disposed along a horizontal axis of the second member proximal to the bottom outer surface in a position parallel to the bottom surface;
   an ultrasonic pulse emitter disposed within the housing, the ultrasonic pulse emitter configured to produce an ultrasonic, modulated, pulsed frequency, inaudible to humans but audible and repellant to canines and other animals;
   a timer in operational communication with the ultrasonic pulse emitter, wherein the timer regulates emissions of an ultrasonic, modulated, pulsed frequency from the ultrasonic pulse emitter over a predetermined length of time;
   an attachment body, wherein the attachment body removably attaches the housing directly to a handlebar of a bicycle;
   a power source disposed within the housing, the power source in operational communication with the ultrasonic pulse emitter;
   an activation-deactivation mechanism in operational communication with the ultrasonic pulse emitter and the power source; and
   a microprocessor in operational communication with the timer and the activation-deactivation mechanism.

2. The dog repelling device of claim 1 wherein the activation-deactivation mechanism is a button disposed on the housing.

3. The dog repelling device of claim 2 wherein the button is centrally disposed on the top surface of the housing, wherein the button has a perimeter disposed proximal to each edge of the top surface.

4. The dog repelling device of claim 3 further comprising a power source state indicator disposed within the button;
   wherein the microprocessor is in operational communication with the power source state indicator.

5. The dog repelling device of claim 4 wherein the power source state indicator comprises light emitting diodes.

6. The dog repelling device of claim 5 wherein the light emitting diodes comprise a first light emitting diode and a second light emitting diode;
   wherein the first light emitting diode is activated when the power source is activated; and
   wherein the second light emitting diode is activated when the power source has a low power level.

7. The dog repelling device of claim 6 wherein the first emitting diode illuminates green upon activation of the power source; and
   wherein the second emitting diode illuminates red upon when low power.

8. The dog repelling device of claim 7 wherein the attachment body comprises:
   a hook and loop strip removably inserted through a continuous slot disposed through the bottom surface of the housing, wherein the housing is removably attached to the bicycle handlebars.

9. The dog repelling device of claim 8 wherein the top surface is pentagonal and has two front sides, a left side, a right side, and a rear side;
   wherein the front sides are shorter than the left side, the right side, and the rear side;
   wherein the front sides coincide in a continuous first apex.

10. The device of claim 9, wherein the power source is a battery within the housing.

11. The device of claim 10 further comprising a battery compartment disposed within the housing;
    wherein the power source is at least one battery;
    wherein each battery is disposed within a battery compartment accessible via the rectangular rear side surface, and secured within by means of a fastening means.

12. The device of claim 11 wherein the fastener is a screw.

\* \* \* \* \*